July 4, 1961 D. S. OLIVER 2,990,783
GEAR PUMPS
Filed Oct. 16, 1959 2 Sheets-Sheet 1
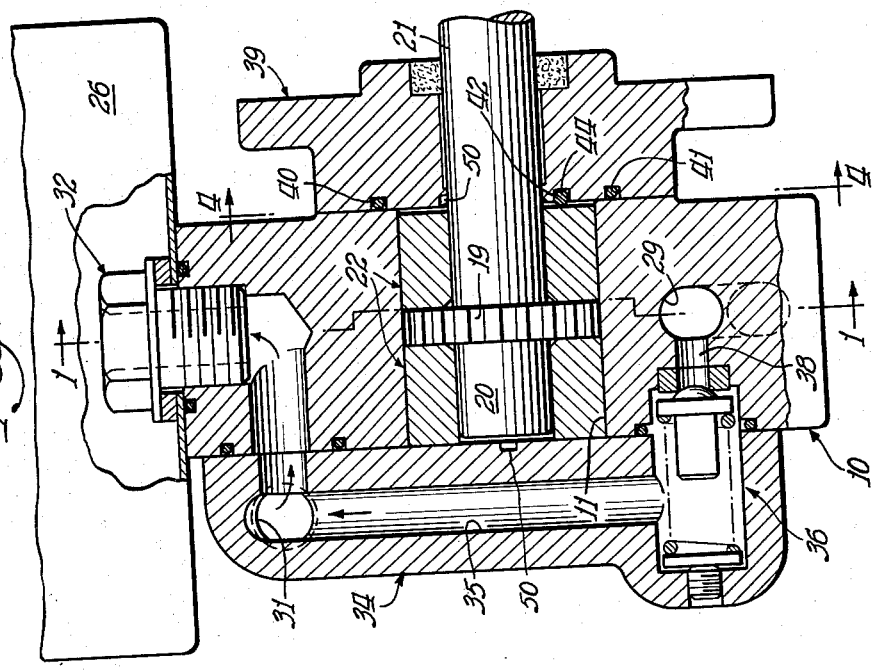
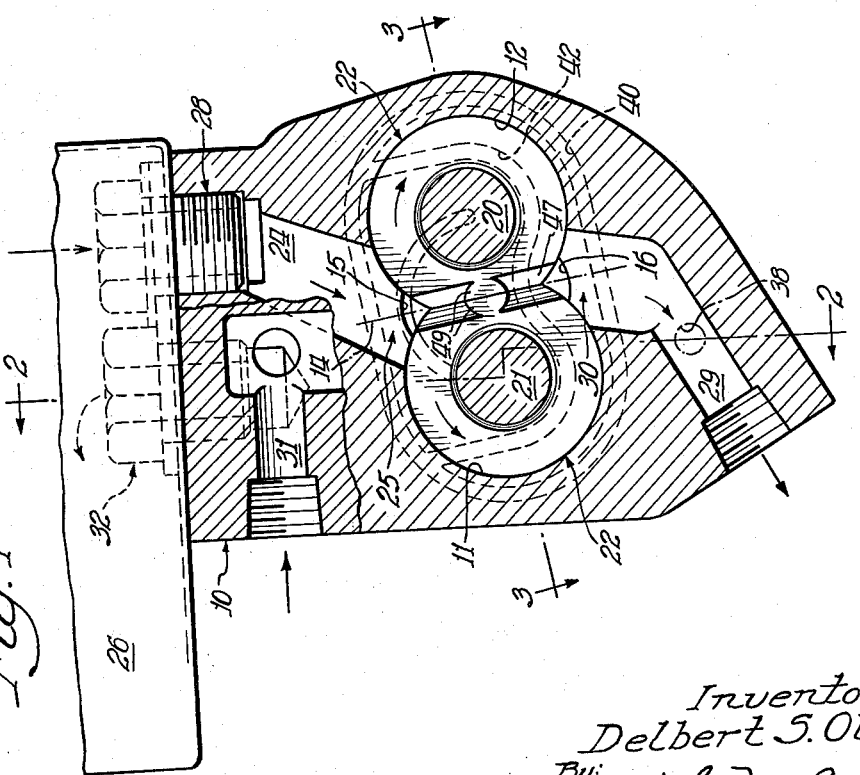
Inventor:
Delbert S. Oliver
By: W. S. McCurry Atty.

July 4, 1961  D. S. OLIVER  2,990,783
GEAR PUMPS
Filed Oct. 16, 1959   2 Sheets-Sheet 2
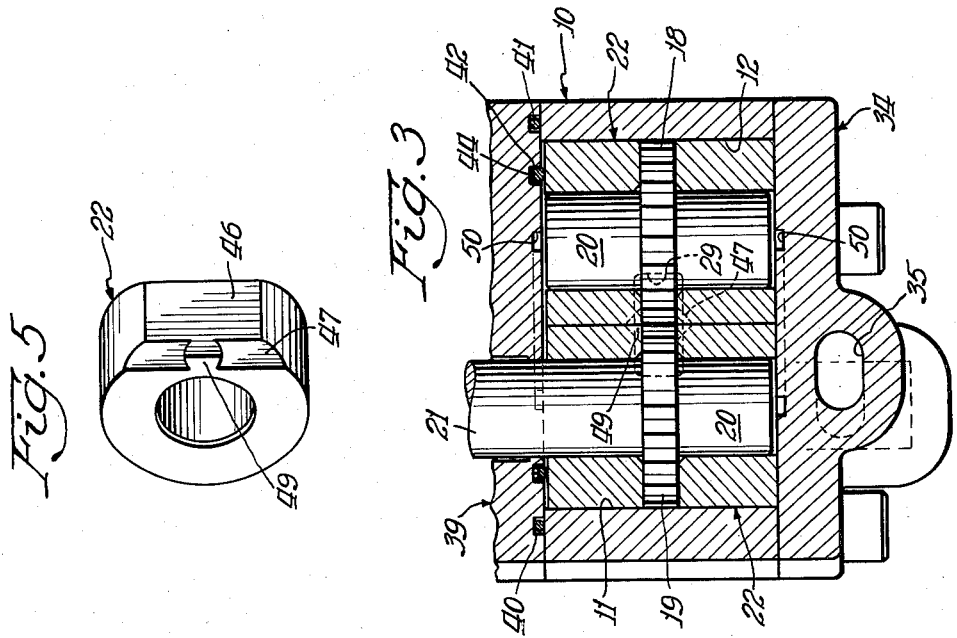
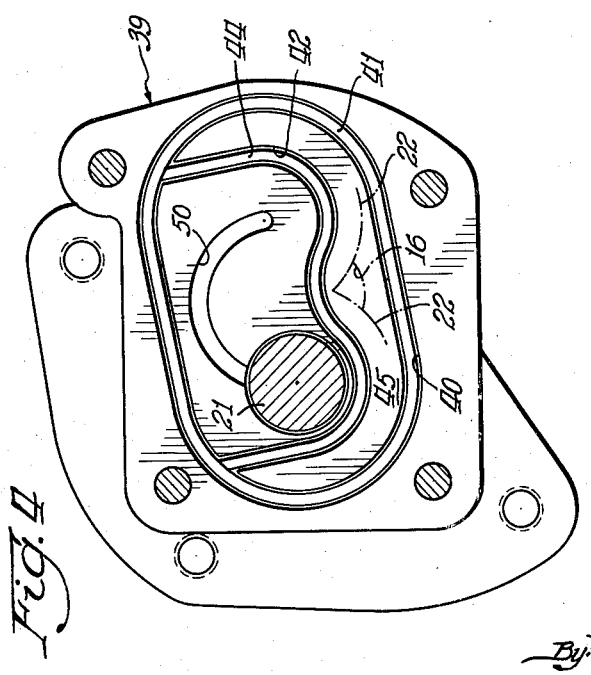
Inventor:
Delbert S. Oliver
By: W. S. McCurry Atty.

United States Patent Office 2,990,783
Patented July 4, 1961

2,990,783
GEAR PUMPS
Delbert S. Oliver, Wooster, Ohio, assignor to Borg-Warner Corporation, Chicago, Ill., a corporation of Illinois
Filed Oct. 16, 1959, Ser. No. 847,015
2 Claims. (Cl. 103—126)

This invention relates to gear pumps and more particularly to gear pumps of the type wherein pressure loaded bearings are utilized.

In the manufacture and design of gear pumps, it has been customary in the past to manufacture the bearing members which support the gear journals in a single piece, i.e. the bearing member would be provided with two spaced, parallel bearing-bores to provide support for the journals of both displacing gears. To reduce leakage and increase volumetric efficiency at high delivery pressures, it is customary to utilize the output pressure of the pump to load the bearing members and urge them into sealing contact with the side faces of the displacing gears. The loading pressure tends to urge the bearing member along the gear journals and into contact with the side faces of the gears. When a one-piece bearing member is utilized, difficulties are encountered whenever the thicknesses of the displacing gears are not identical. Obviously, when one gear is of a slightly greater thickness than the other, the thicker gear will preclude further movement of the adjacent half of the bearing member while the other half is still unrestrained. The loading pressure then tends to cock or tilt the bearing member with consequent binding of the gear journals within the bearing-bores. This difficulty may be minimized through utilization of a high degree of care during the various machining operations. Manifestly, this solution has its limits and it would be desirable to obviate this condition entirely.

It is therefore the primary object of this invention to provide new and improved pressure loaded gear pumps free from any tendency of the bearings to bind the gear journals when pressure loaded.

It is another object of this invention to provide a pressure loaded gear pump wherein each of the gear journals is provided with an individual journal bearing capable of movement independent of the other journal bearings.

It is still another object of this invention to provide a pressure loaded gear pump having a pressure responsive device for interconnecting the outlet and inlet sides of the pump to permit continuous operation of the pump independent of load demand.

It is yet another object of this invention to provide a pressure loaded gear pump having provision for returning lubricating fluid, which has leaked past the gear side faces and through the journal bearings, to the inlet side or zone of the pump.

With these and other objects in view, the present invention contemplates a gear pump formed of a chambered housing having two journalled, intermeshing, displacing gears mounted for rotation therein by means of individual journal bearings supporting each gear journal and capable of independent axial movement thereon. End covers are secured to the housing to retain the gears and journal bearings within the housing and in pumping relationship whereby the journal bearings and the walls of the housing cooperate to define a pumping chamber surrounding the intermeshing gears. A sealing member is interposed between one of the end covers and one set of journal bearings to define a pressure loading cavity which is in fluid communication with the outlet zone or side of the pump. The other end cover is provided with a passage including a relief valve for interconnecting the outlet and inlet zones or sides of the pump whenever the outlet pressure becomes excessive. Each of the end covers are provided with a passage therein for connecting the areas of the end covers which are adjacent the ends of the gear journals with the inlet side or zone of the pump to permit lubricating fluid which has leaked from the journal bearings to be returned to the inlet.

Other objects, advantages and novel features of the invention will become apparent upon consideration of detailed discussion taken in conjunction with the accompanying drawings wherein:

FIG. 1 is a sectional view of an apparatus embodying the primary features of the invention and taken along the line 1—1 of FIG. 2;

FIG. 2 is a sectional view taken along the line 2—2 of FIG. 1 and illustrates to advantage the pressure relief arrangement utilized in the present invention;

FIG. 3 is a sectional view taken along the line 3—3 of FIG. 1 and illustrates the individual journal bearings utilized for each of the gear journals;

FIG. 4 is a sectional view taken along the line 4—4 of FIG. 2 and illustrates the configuration of the sealing members which define the pressure loading cavity; and FIG. 5 is a perspective view of one of the individual journal bearings.

Attention now is directed to the drawings wherein like numerals of reference designate like parts throughout the several views and in particular to FIGURES 1-3. The gear pump of the present invention comprises a housing 10 having formed therein substantially cylindrical, parallel chambers 11 and 12 which intersect along a chordal plane designated 14. The housing 10 is further provided with arcuate indentations 15 and 16 which are formed by cutting away portions of the housing adjacent the chordal plane 14. These indentations extend from end to end of the housing 10.

Disposed within the chambers 11 and 12 are displacing gears 18 and 19, respectively. The gears 18 and 19 are in mesh substantially along the chordal plane 14. The gears 18 and 19 are provided with journals 20 which are formed integral therewith. As is best illustrated in FIG. 3, one of the journals 20 of the gear 19 is extended to form an input shaft 21. The shaft 21 is rotated by a suitable means (not shown) to provide a drive for the pump. The journals 20 are rotatably supported by means of journal bearings 22 which are so machined as to be a close fit on the journals 20 and within the chambers 11 and 12. The journal bearings 22 cooperate with the walls of the chambers 11 and 12 to define a pumping chamber surrounding the intermeshing gears 18 and 19.

The housing 10 is provided with an inlet passage 24 which connects with the inlet zone or side of the aforementioned pumping chamber designated generally by the reference numeral 25. The inlet passage 24 is also in fluid communication with a reservoir 26, which is secured to the housing 10, by means of a fitting 28. The housing 10 also has an outlet passage 29 formed therein which connects with the outlet zone or side of the pump chamber designated generally by the reference numeral 30. The outlet passage 29 is adapted to be connected to a load (not shown) such as the power servo to a power steering mechanism for an automobile. The housing 10 is further provided with a return passage 31 which receives the return fluid from the load and communicates the same to the reservoir 26 through a fitting 32.

An end cover 34 (FIG. 2) is secured to one side of the housing 10 and serves to retain the journal bearings 22 within the housing. The cover 34 is provided with a pressure relief passage 35 which is in fluid communication with the return passage 31. The cover is also provided with an adjustable relief valve, designated generally by the reference numeral 36 which is in direct communication with the passage 35 and which also communicates with the outlet passage 29 through an auxiliary passage 38.

A second end cover 39 is secured to the other side of the housing 10 and serves to retain gears 18 and 19 and journal bearings 22 within the housing and in pumping relationship. As best seen in FIG. 4, the cover 39 is provided with a groove 40 within which is positioned an endless flexible sealing member 41. The member 41 serves to provide a fluid seal between the housing 10 and the cover 39. The cover 39 is provided with a second groove 42 within which is provided a second flexible sealing member 44. The ends of the member 44 abut the sealing member 41 as shown in FIG. 4 and, together with a portion of the member 41, serve to define a pressure loading cavity or area designated generally by the reference numeral 45.

Operation

In order that a better understanding of the invention may be had, its mode of operation will now be described. The input shaft 21 is rotated by the suitable drive means in such a manner as to cause the gears 18 and 19 to rotate in the directions indicated by the arrows in FIG. 1. The fluid being pumped flows from the reservoir 26 to the inlet side 25 of the pumping chamber through the fitting 28 and the inlet passage 24. The rotating gears 18 and 19 then displace the fluid to the outlet side 30 in a well known manner. The fluid then flows through the outlet passage 29 and to the load. The fluid pressure developed at the outlet zone 30 will, of course, be determined by the back pressure exerted by the load. This pressure is ordinarily a predetermined value which will not vary from one operation to the next. From the load, the pumped fluid then returns to the reservoir 26 through the return passage 31 and fitting 32.

As may best be seen in FIG. 5, the journal bearings 22 are cylindrical except for flats 46 which are provided thereon. The flats 46 define the mating surfaces of adjacent journal bearings which are in abutting relationship along the chordal plane 14. The journal bearings are further provided with cut-away portions 47 which define projections 49. The journal bearings 22 are assembled in the housing so that the cut-away portions 47 and the projections 49 are adjacent the side faces of the gears 18 and 19 as is best illustrated in FIGS. 1 and 3. When the journal bearings 22 are assembled in the housing, the paired, cut-away portions 47 form V-shaped fluid passages between the inlet and outlet zones and the points where the gear teeth are in mesh along the chordal plane 14. On the outlet side, these passages function as trapping reliefs as is well known in the art. On the inlet side, these passages serve no useful purpose but the journal bearings 22 are formed with the cut-away portions 47 on both sides in order that the bearings may be completely interchangeable among the various positions. The projections 49 mate, as is best illustrated in FIG. 1, and in abutting relationship with the side faces of the gear teeth to preclude direct fluid communication between the inlet and outlet sides of the pump along the passages formed by the cut-away portions 47.

The high fluid pressure present at the outlet zone 30 is transmitted to the pressure loading area or cavity by means of the passage defined by the arcuate indentation 16 and the adjacent portions of the outer walls of the associated journal bearings 22. The high pressure fluid flows through the aforementioned passage and spreads out through the entire pressure loading cavity defined by the sealing members 41 and 44, the end cover 39 and portions of the outer end faces of the associated journal bearings 22 to exert a force on these journal bearings tending to hold them firmly against the side faces of the gears 18 and 19. The configuration of the area 45 which is shown in FIG. 4 was selected to provide loading pressure at such points that it will directly oppose the internal pressures created due to pumping action of the rotating gears. As is well known in the art, the pressure gradient from inlet to outlet is not uniform in gear pumps of this type, i.e. the fluid pressure rises rapidly between the last few gear teeth approaching the outlet zone. The fluid between each adjacent pair of gear teeth is subjected to substantially no pressure increase over inlet pressure until the fluid has been displaced approximately half way from the inlet to the outlet side of the pump. Consequently, the area 45 shown in FIG. 4 does not provide for any pressure loading of the portions of the journal bearings which are adjacent the inlet side of the pump. The physical area of the cavity 45 is selected so that the total load exerted on the journal bearings thereby will slightly exceed the total load exerted on the bearings due to the internal pumping pressures.

The high pressure fluid flows through the outlet passage 29 to the load, performs its function, and returns to the reservoir 26 through the return passage 31 and fitting 32. The pump disclosed is designated for continuous operation. Should the demand for high pressure fluid at the load cease, the resultant pressure build-up due to continuous operation of the pump will result in opening of the relief valve 36. The fluid being pumped will then return to the reservoir 26 through the relief valve 36, the return passage 31 and the fitting 32. A subsequent demand for high pressure fluid will result in a pressure drop at the outlet which will permit the relief valve 36 to seat. The fluid being pumped will then again flow to the load until such time as the load demand ceases at which time the relief valve 36 will again function as above described.

During the operation of gear pumps of this type, it is inevitable that at least a small quantity of the fluid being pumped will leak between the side faces of the displacing gears and the inner end faces of the journal bearings and from there through the journal bearings to the outer extremities of the gear journals. This is far from an undesirable situation in that it provides requisite lubrication for the journal bearings and journals and thus prevents seizing thereof. However, some provision must be made to remove this fluid once it has exited from the journal bearings. To this end the covers 34 and 39 are each provided with an arcuate groove 50 (FIGS. 1, 3 and 4) which provides fluid communication between the outer extremities of the gear journals and journal bearings, and the passages defined by the arcuate indentations 15 and the adjacent portions of the outer walls of the journal bearings 22. The leakage fluid may thus flow through the passage 50 and then the aforedescribed passage to return to the inlet side of the pump.

It is to be understood that the above described embodiment of the invention is merely intended to be illustrative of the principal features of the invention. Numerous other arrangements and modification may be readily devised by those skilled in the art to achieve a similar apparatus which will still be encompassed by the spirit and scope of the present invention.

What is claimed is:

1. A pressure loaded gear pump comprising a housing having therein a pair of substantially cylindrical chambers intersecting along a chordal plane, a pair of intermeshing displacing gears disposed for rotation within said chambers, a plurality of journals formed integral with said gears and extending axially therefrom, a journal bearing rotatably supporting each of said gear journals, said journal bearings being positioned in said chambers and adapted for independent axial movement therein and along said journals, each of said journal bearings having a flat portion and having cut-away portions defining a projection intermediate one edge of said flat portion such that adjacent journal bearings abut along said chordal plane such that said cut-away portions define an inlet V-shaped fluid passage and an outlet V-shaped fluid passage while simultaneously cooperating with said housing to define a pumping chamber surrounding said gears, a first cover secured to one end of said housing for retaining said gears and said journal bearings within said housing, a second cover secured to the other end of said housing and cooperable with said first cover for retaining said gears and said journal bearings in pumping relationship, a sealing member interposed between one of said covers and the adjacent journal bearings to define a pressure loading cavity, means defining a passage interconnecting said outlet V-shaped fluid passage and said pressure loading cavity, and means defining lubricating passages formed in each cover and providing fluid communication between extremities of said journals and said inlet V-shaped fluid passage.

2. A pressure loaded gear pump comprising a housing having therein a pair of substantially cylindrical chambers intersecting along a chordal plane, a pair of intermeshing displacing gears disposed for rotation within said chambers, a plurality of journals formed integral with said gears and extending axially therefrom, a journal bearing rotatably supporting each of said gear journals, said journal bearings being positioned in said chambers and adapted for independent axial movement therein and along said journals, each of said journal bearings having a flat portion and having cut-away portions defining a projection intermediate one edge of said flat portion such that adjacent journal bearings abut along said chordal plane such that said cut-away portions define an inlet V-shaped fluid passage and an outlet V-shaped fluid passage while simultaneously cooperating with said housing to define a pumping chamber surrounding said gears, a first cover secured to one end of said housing for retaining said gears and said journal bearings within said housing, a second cover secured to the other end of said housing and cooperable with said first cover for retaining said gears and said journal bearings in pumping relationship, a sealing member interposed between one of said covers and the adjacent journal bearings to define a pressure loading cavity between said cover and a portion of said bearing, said portion being remote from said bearing adjacent the inlet side of said pump, means defining a passage interconnecting said outlet V-shaped passage and said pressure loading cavity, and means defining lubricating passages formed in each cover and providing fluid communication between extremities of said journals and said inlet V-shaped passage.

References Cited in the file of this patent

UNITED STATES PATENTS

| | | |
|---|---|---|
| 1,285,819 | Smith | Nov. 26, 1918 |
| 2,735,372 | Booth et al. | Feb. 21, 1956 |
| 2,816,510 | Jarvis | Dec. 17, 1957 |
| 2,842,066 | Hilton | July 8, 1958 |

FOREIGN PATENTS

| | | |
|---|---|---|
| 523,969 | Italy | Apr. 19, 1955 |
| 738,782 | Great Britain | Oct. 19, 1955 |
| 815,505 | Great Britain | June 24, 1959 |
| 1,055,365 | Germany | Apr. 16, 1959 |